United States Patent
Jacobs et al.

(10) Patent No.: US 9,003,465 B1
(45) Date of Patent: Apr. 7, 2015

(54) METHOD AND SYSTEM FOR CONVERTING CONTENT INTO MULTIPLE FORMATS

(75) Inventors: Mitch C. Jacobs, Malibu, CA (US); Mitchell B. Wasden, Redondo Beach, CA (US); Hanno Basse, Santa Monica, CA (US); Ranny Q. Sue, Laguna Niguel, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 924 days.

(21) Appl. No.: 12/150,153

(22) Filed: Apr. 25, 2008

(51) Int. Cl.
*H04N 7/173* (2011.01)
*H04N 21/2343* (2011.01)

(52) U.S. Cl.
CPC ..... *H04N 21/2343* (2013.01); *H04N 21/23439* (2013.01)

(58) Field of Classification Search
None
See application file for complete search history.

(56) References Cited

U.S. PATENT DOCUMENTS

| | | | |
|---|---|---|---|
| 5,579,055 A | | 11/1996 | Hamilton et al. |
| 5,594,490 A | * | 1/1997 | Dawson et al. ............... 725/67 |
| 6,028,639 A | * | 2/2000 | Bhatt et al. ................. 348/441 |
| 6,401,243 B1 | | 6/2002 | Suzuki |
| 6,700,932 B2 | * | 3/2004 | Shen et al. ............. 375/240.12 |
| 6,772,209 B1 | | 8/2004 | Chernock et al. |
| 6,963,590 B1 | * | 11/2005 | Mann et al. .................. 370/535 |
| 7,103,906 B1 | | 9/2006 | Katz et al. |
| 7,181,010 B2 | * | 2/2007 | Russ et al. .................... 380/234 |
| 7,254,622 B2 | * | 8/2007 | Nomura et al. ............... 709/219 |
| 7,277,870 B2 | | 10/2007 | Mourad et al. |
| 7,301,944 B1 | * | 11/2007 | Redmond .................. 370/390 |
| 7,778,875 B2 | | 8/2010 | Schauser et al. |
| 2001/0004769 A1 | | 6/2001 | Simon |
| 2002/0009283 A1 | | 1/2002 | Ichioka et al. |
| 2002/0023268 A1 | | 2/2002 | LaRocca et al. |
| 2002/0103920 A1 | | 8/2002 | Berkun et al. |
| 2003/0028889 A1 | | 2/2003 | McCoskey et al. |
| 2003/0066085 A1 | | 4/2003 | Boyer et al. |
| 2003/0121047 A1 | | 6/2003 | Watson et al. |
| 2004/0019900 A1 | | 1/2004 | Knightbridge et al. |
| 2004/0103120 A1 | | 5/2004 | Fickle et al. |
| 2004/0236620 A1 | | 11/2004 | Chauhan et al. |
| 2005/0203927 A1 | | 9/2005 | Sull et al. |
| 2006/0053347 A1 | | 3/2006 | van Ingen et al. |
| 2006/0171390 A1 | | 8/2006 | La Joie |
| 2006/0206912 A1 | | 9/2006 | Klarfeld et al. |
| 2006/0212900 A1 | | 9/2006 | Ismail et al. |
| 2006/0212904 A1 | | 9/2006 | Klarfeld et al. |

(Continued)

FOREIGN PATENT DOCUMENTS

| | | |
|---|---|---|
| EP | 1202507 A | 5/2002 |
| WO | 0169868 A | 9/2001 |

OTHER PUBLICATIONS

Non-final Office action dated Jul. 21, 2010 in U.S. Appl. No. 11/828,625, filed Jul. 26, 2007 by Mitch C. Jacobs.

(Continued)

*Primary Examiner* — Oschta Montoya

(57) ABSTRACT

A communication system 10 includes a content processing system 12 and a distribution system 14. The content processing system 12 receives content and stores the content in a first file format in the content repository 40. A workflow system 54 determines a target for the content and routes the content to a content converter 64 corresponding to the target. The content converter 60 converts the content and forms a second file in a second format different than the first format. The content repository 40 stores the second file therein.

16 Claims, 3 Drawing Sheets

(56) References Cited

U.S. PATENT DOCUMENTS

| | | |
|---|---|---|
| 2007/0022214 A1 | 1/2007 | Harcourt |
| 2007/0033531 A1 | 2/2007 | Marsh |
| 2007/0079168 A1 | 4/2007 | Sivakumar et al. |
| 2007/0089151 A1 | 4/2007 | Moore et al. |
| 2007/0107012 A1 | 5/2007 | Rachamadugu |
| 2007/0107032 A1 | 5/2007 | Rachamadugu |
| 2007/0130235 A1 | 6/2007 | Rakoff et al. |
| 2007/0199022 A1 | 8/2007 | Moshiri et al. |
| 2007/0199037 A1* | 8/2007 | Matsuzaki et al. ............ 725/115 |
| 2007/0250487 A1 | 10/2007 | Reuther |
| 2008/0022347 A1 | 1/2008 | Cohen |
| 2008/0216111 A1 | 9/2008 | Alten et al. |
| 2008/0222678 A1 | 9/2008 | Burke et al. |
| 2008/0282190 A1 | 11/2008 | Kagaya |
| 2008/0309647 A1 | 12/2008 | Blose et al. |
| 2009/0029644 A1 | 1/2009 | Sue et al. |
| 2009/0240735 A1 | 9/2009 | Grandhi et al. |
| 2010/0088497 A1 | 4/2010 | Bunin |
| 2010/0241476 A1 | 9/2010 | Fitzpatrick et al. |

OTHER PUBLICATIONS

Non-final Office action dated Jan. 3, 2011 in U.S. Appl. No. 11/828,625, filed Jul. 26, 2007 by Mitch C. Jacobs.

Final Rejection dated Jun. 27, 2011 in U.S. Appl. No. 11/828,625, filed Jul. 26, 2007 by Mitch C. Jacobs.

Non-final Office action dated Feb. 11, 2013 in U.S. Appl. No. 11/828,625, filed Jul. 26, 2007 by Mitch C. Jacobs.

Notice of Allowance dated Jun. 20, 2014 in U.S. Appl. No. 11/828,625, filed Jul. 26, 2007 by Mitch C. Jacobs.

Final Rejection dated Sep. 16, 2013 in U.S. Appl. No. 11/828,625, filed Jul. 26, 2007 by Mitch C. Jacobs.

* cited by examiner

US 9,003,465 B1

METHOD AND SYSTEM FOR CONVERTING CONTENT INTO MULTIPLE FORMATS

TECHNICAL FIELD

The present disclosure relates generally to communication systems, and more particularly to a method an apparatus for processing content to be communicated into various formats.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers.

Satellite television providers receive content from tapes, DVDs, and satellite links. Manual ingestion of the content is typically performed to provide a specific format. If multiple formats are required, ingestion takes place as many times as needed. For some broadcast systems, up to five different formats are required and, thus, five different manual ingestions are performed. This is a time and labor-intensive process.

It would therefore be desirable to reduce the amount of time and labor associated with receiving content in a satellite distribution system.

SUMMARY

The present invention advantageously automates the format conversion process to provide various formats for the different content.

In one aspect of the invention, a method of forming a content signal receiving content, storing the content in a first file format in a first file in a content repository, determining a target for the content, routing the content using a workflow system to a content converter in response to the target. The method also includes converting the content at the content converter and forming a second file in a second format different than the first format and storing the second file in the content depository.

In another aspect of the invention, a system for processing content includes a receiving system receiving the content, a content repository storing the content in a first format in a first file, a workflow system determining a target for the content and routing the content to the content converter corresponding to the target. A content converter converts the content and forms a second file in a second format different than the first file. The content repository stores the second file therein.

One feature of the disclosure is that the original content may be automatically converted into the desired number of formats.

A further feature of the disclosure associates the original content and the multiple converted files in a storage system.

Yet another feature of the disclosure is that an analyzer tool may provide feedback as to errors in the system. The analyzer enhances the quality output of the various content.

DRAWINGS

The drawings described herein are for illustration purposes only and are not intended to limit the scope of the present disclosure in any way.

DETAILED DESCRIPTION

Figure 1:
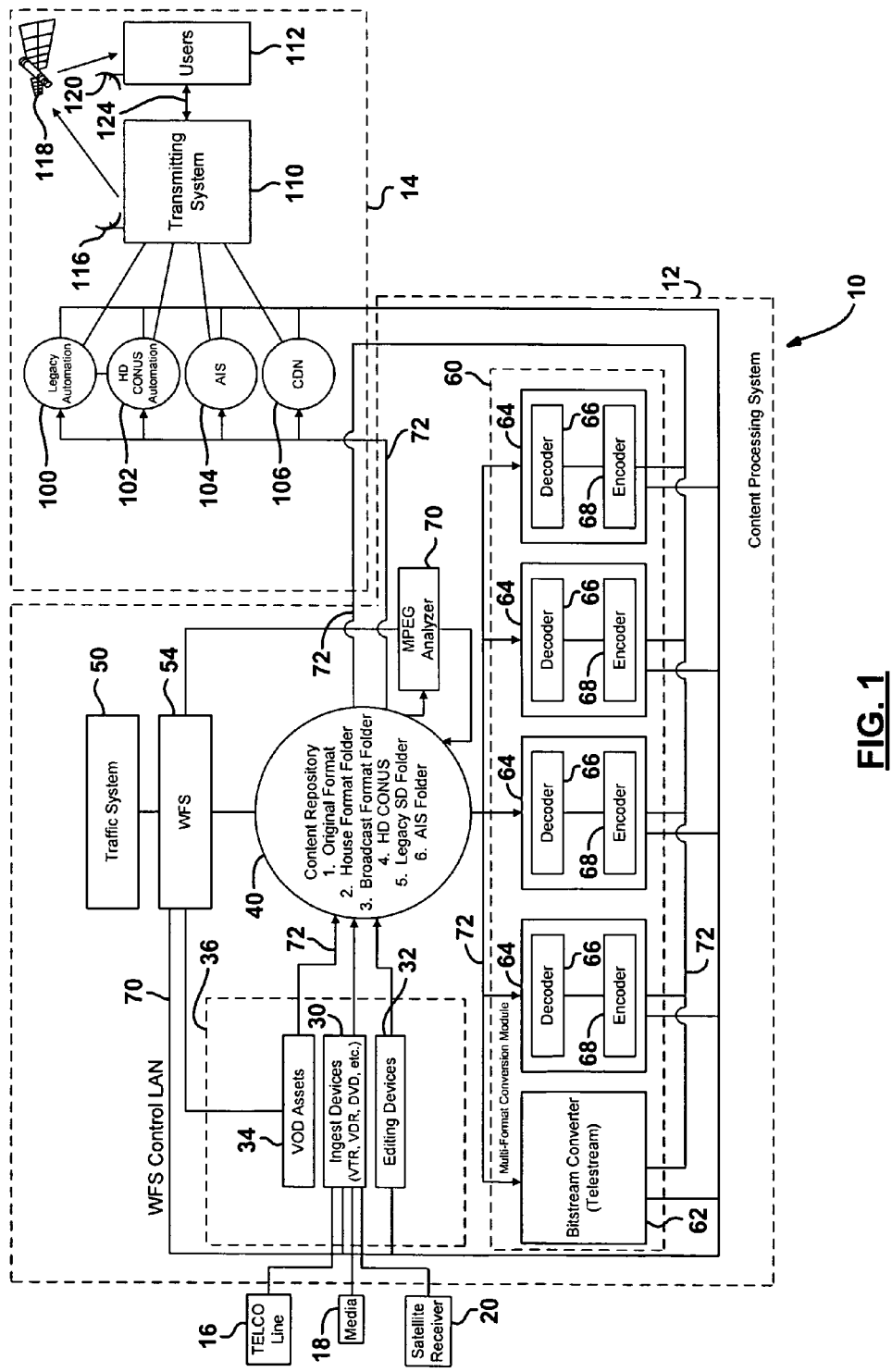
FIG. 1 is a block diagrammatic view of a content processing system according to the disclosure.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite transmission and data transmission and reception for home or business uses. The system may also be used in a cable system or wireless terrestrial communication system for generating an output signal.

A communication system includes a central processing system 12 and a distribution system 14. The central processing system 12 receives content from a telecommunication line 16 such as a copper wire or an optical fiber, media 18 including video tapes, DVDs, and other memory formats. The content processing system 12 also receives content from a satellite receiver 20. The received content from the telecommunication line 16, media 18, and satellite receiver 20 may be in various formats that require content processing. The content processing system 12 processes the received content into various formats which are then available to a distribution system 14. The distribution system 14 may be a terrestrial-based system or an extraterrestrial-based system. The terrestrial-based system may be a wireless or wired system. The extraterrestrial-based system is a wireless system that may utilize satellites and stratospheric platforms.

The content processing system 12 receives the content from the Telco line 16, from the various media 18 or satellite receiver 20 into ingest devices 30. One or a combination of receiving means may be used. The received content may be processed and edited in editing devices 32. Various video-on-demand assets 34 may also include various content. The video-on-demand assets 34 may be proprietary sources for a particular system. The video-on-demand assets 34 may contain various video content such as movies, shows or other events. The output of the ingest devices 30, the editing devices 32, and the video-on-demand assets 34 may be stored within a content repository 40. The ingest devices 30, the editing devices 32, and the video-on-demand assets 34 may constitute a receiving system 36. The content repository 40 may store the original content in an original format folder thereon. The content repository 40 may be formed of various types of memory devices including servers, hard drives, hard drive systems, and various other memory-type systems.

The content repository 40 may be various types of storage including a storage area network (SAN) or a network attached storage (NAS). The content repository may be horizontally and vertically scaled by adding additional nodes or systems to increase the storage capability. As will be described further below, the content repository 40 may include multiple folders, one for each of a specified format for a corresponding broadcast system. Folders, for example, may include an original folder for storing the original format received by the receiving system 36. A house format folder may also be used to store processed content into a house format. A broadcast format folder may include material ready for broadcast on a particular system. Other formats include high definition continental United States format, various legacy systems for supporting previous systems, and an ad insertion folder for inserting various ads into the content.

The content processing system 12 may also include a traffic system 50. The traffic system 50 identifies targets to the particular broadcast system. The targets correspond to the uses and the corresponding systems of the received content. By identifying the targets, the proper decoding and encoding of the content may be provided. The traffic system 50 may be a computer-based system and may include both hardware and software.

The traffic system 50 communicates with a workflow system 54. The workflow system 54 is used to direct the content from the receiving system 36 to the content repository and stores the processed content in the various folders in the content repository 40.

The traffic system 50 is alerted to the presence of new content at the receiving system 36. The content includes metadata informing the traffic system 50 of pertinent data including an asset identification, a provider identification, title, the revision level, and the like. Cable labs specifications 1.1 and 2.0 may be utilized for providing the metadata in a specific format.

The traffic system 50 communicates the specified broadcast target for the particular content to the workflow system 50. The workflow 50 system may include a material identification and associate the material identification with the asset identification in the original format folder in the content repository. A file from the folder may be automatically copied and processing through the content processing system. The content may be processed for various types of video resolution, audio configurations, including AC3, AAC+, PCM, or other audio formats. Preservation of data, including content in VANC or VITC, metadata, and PES or PMT. The workflow system 54 directs the content repository 40 to provide the content for processing to the multi-format conversion module 60. The multi-format conversion module 60 may include various modules including a bit stream converter 62 and a plurality of decoder and encoder pairs 64. Each decoder and encoder pair includes a decoder 66 and an encoder 68. As mentioned above, the content may be received in various formats. Therefore, various decoders for decoding possible formats may be provided.

Encoder 68 encodes the decoded format into various formats. As mentioned above, various types of video formats, as well as various qualities of signals, may be provided. For example, an MPEG2 and MPEG4 formats may be encoded at the encoder 68. Various qualities such as 480i, 480p, 720p, 1080i, and 1080p may also be provided.

An MPEG analyzer 70 may be used to receive a various format folder such as the house format folder and analyze the folder prior to encoding and decoding. The MPEG analyzer 70 verifies the quality of the file while maintaining the integrity of the file for broadcast. The MPEG analyzer 70 may analyze the file in the house file format in the content repository by making a copy of that file as directed by the workflow system 54 and storing the file on the local hard disk at the MPEG analyzer 70. A series of error checks may be performed on the file within the MPEG analyzer 70. The MPEG analyzer 70 may send a report to the workflow system corresponding to a valid file or, if validation fails, the workflow system 54 is informed of the failure. In response to the MPEG analyzer indicating a failure, the workflow system 54 may direct the file to be re-processed. The workflow system 54 informs the traffic system 50 that content is available for the next set of processes. If no other processes are needed, then the workflow system 54 makes a copy of the file and places the copy into the broadcast format folder of the content repository 54. The workflow system 54 informs the traffic system 50 that a file is available for broadcast in the format folder.

A local area network (LAN) 70 may be used to connect the workflow system 54, the traffic system 50, the receiving system 36, the format conversion module 60, the MPEG analyzer 70, and the distribution system 14. Control signals may be passed through the local area network. The local area network may or may not include the ability to transfer files. The file transfer network is illustrated as reference numeral 72.

Distribution system 14 may include various types of systems. Although only one distribution system may be used, several distribution systems are illustrated. Distribution system 14 may include a legacy system that includes legacy automation 100 for older systems of a particular business. A high definition continental United States (HD-CONUS) automation system 102 may also be included within the distribution system. An ad insertion system 104 may also be included in the system. A content distribution network (CDN) 106 may also be included in the distribution system. The various systems 100-106 poll the workflow system 54 for content availability. The systems 100-106 may poll content from the specific directory on the content repository and deliver them thereto. The directory may correspond to or contain the type of file required for that system. The systems 100-106 are coupled to a transmitting system 110 for distribution of the content for processed content to the users 112. The transmitting system 110 may include an antenna 116 for transmitting signals to a satellite 118. The signals from the satellite 118 are downlinked to an antenna 120 at the users 112. Of course, the satellite 118 may be replaced by a stratospheric platform or terrestrial towers. The transmitting system 110 may also be coupled to users through a terrestrial connection 124. The terrestrial connection 124 may be a broadband connection such as an optical fiber connection or a copper wire-based connection. The cooper wire-based connection may be a telephone line.

Users 112 may also generate request signals to the transmitting system 110 in a video-on-demand situation. Various content may be provided to the users upon generating a request at the users and transmitting the request through the terrestrial connection 124. Traditional access or the like may also be provided through the terrestrial connection 124.

Figure 2:
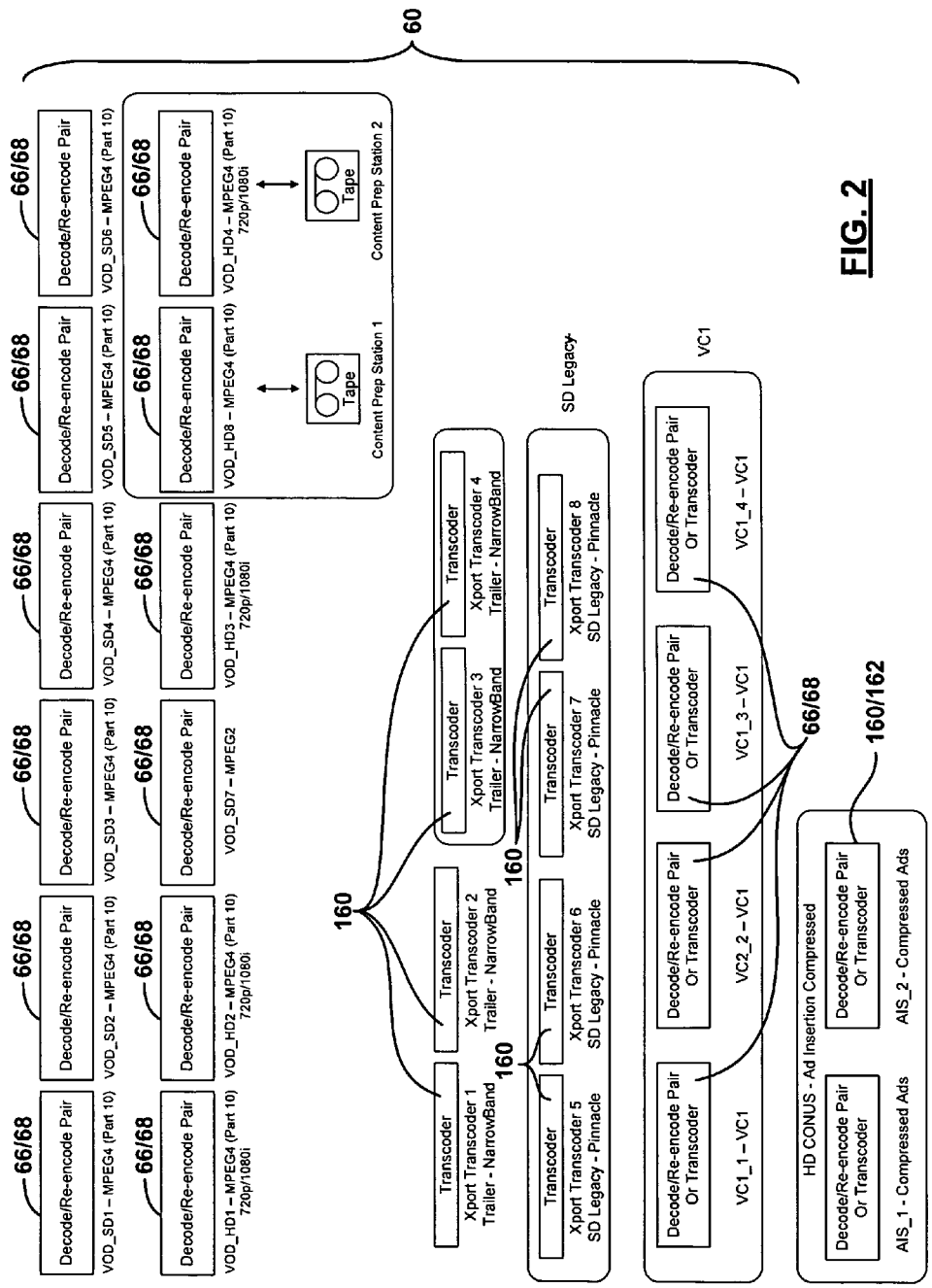
FIG. 2 is a block diagrammatic view of the multi-format conversion module of FIG. 1.

Referring now to FIG. 2, the multi-format conversion module 60 is illustrated in further detail. A plurality of decoder re-encoder pair 66/68 are illustrated in FIG. 2. In the first row the output is in the SD format for video on demand (VOD) in MPEG4 (Part10). Various formats may be supported as mentioned above. Six pairs are illustrated although various numbers could be provided. In the second row, a high definition video on demand output is provided. Some of the stations may include content preparation stations for receiving tapes or other media.

In the third row, a plurality of transcoders 160 may also be provided. The third row generates outputs in the XPORT® format. The transcoders 160 are used to change the coding from one code to another without decoding and re-encoding. Row 4 changes the output to an SD legacy Pinnacle format.

Row 5 may be a transcoder or a decoder/re-encode pair that changes the code to a VC1 output format.

Ad insertion decoder re-encoders 160/162 may be provided for inserting compressed ads into the distribution system 14.

Figure 3:
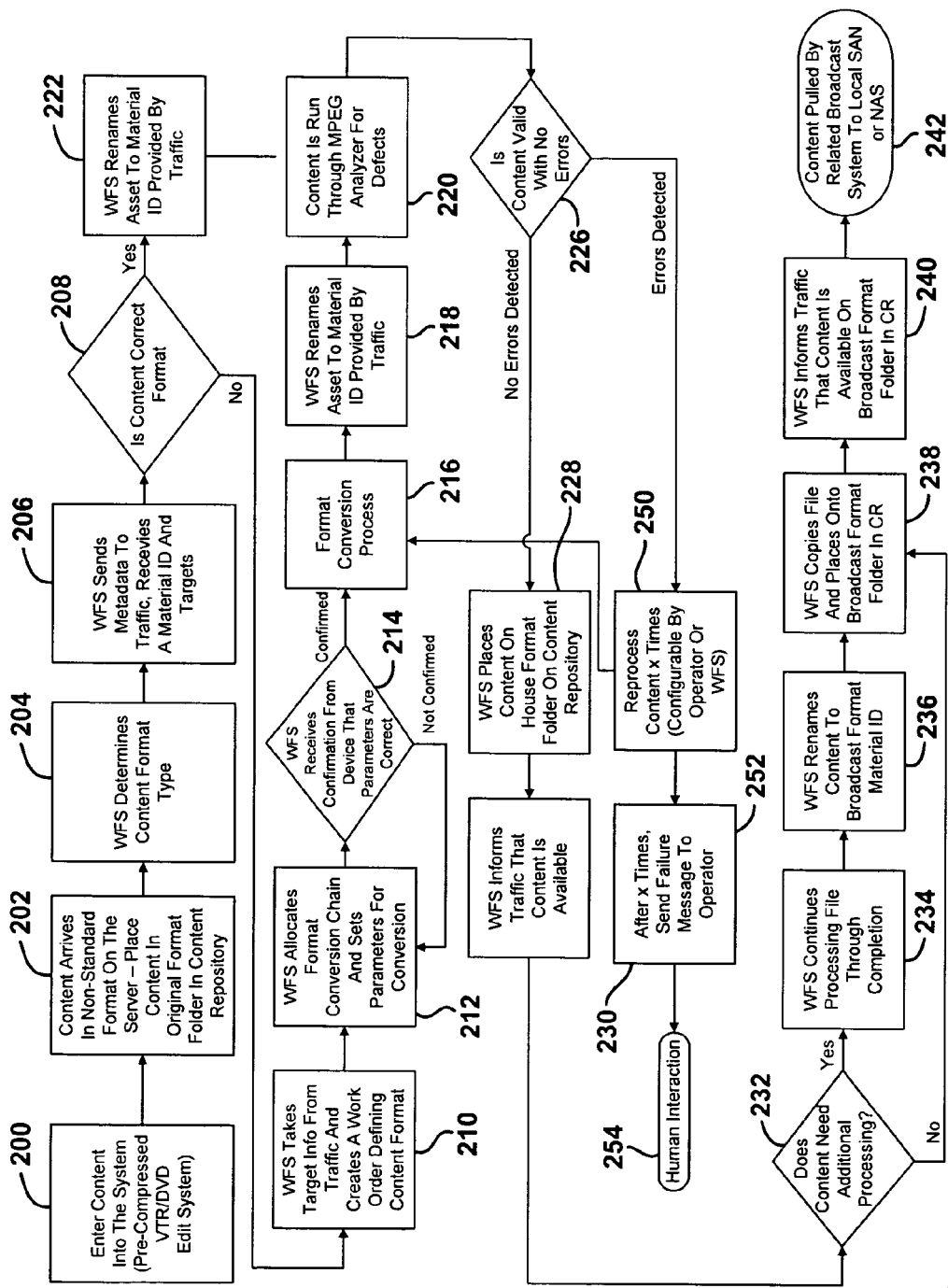
FIG. 3 is a flowchart of a method for operating the present disclosure.

Referring now to FIG. 3, a method of operating the content processing system is illustrated. In step 200, various types of content are entered into the system. As mentioned above, the content may be entered in various manners including a telephone line, a video disk, video tape, and through an editing system. In step 202, content arrives in a non-standard format and is provided to the content repository. The original content may be placed in an original format folder in the content repository. In step 204, the workflow system determines the content format type. In step 206, the workflow system sends metadata to the traffic system 50 and receives a material identification and targets from the traffic system 50. In step 208, if the content is not in a correct format, the workflow system takes the target information from the traffic system and creates a work order defining a content format. In step 212, the workflow system allocates the format conversion chain and sets parameters for conversion. In step 214, when the workflow system receives a confirmation from the device that the parameters are correct, the format conversion process is performed at the format conversion module in step 216. If the confirmation is not performed in step 214, step 212 is again executed. After step 216, step 218 renames the asset to the material ID provided by the traffic system in the workflow system. In step 220, content is processed through the MPEG analyzer 220 to determine defects.

Referring back to step 208, if the content was in a proper format, the workflow system renames the asset to the material ID provided by the traffic system in step 222. After step 222, step 220 is performed. In step 226, if the content is valid with no errors, step 228 is performed. In step 228, the workflow system provides content on the house format folder on the content repository. After step 228, step 230 informs the traffic system that the content is available. After step 230, step 232 determines whether additional content processing is required. If additional content processing is required in step 232, step 234 continues processing the file through completion under the control of the workflow system. In step 236, the workflow system renames the content to the broadcast format material ID. After step 232 determines that no additional content is provided and after step 236, step 238 copies the files and places them into the broadcast format folder in the content repository using the workflow system. In step 240, the workflow system informs the traffic system that content is available in the broadcast format folder in the content repository 40. In step 242, content is pulled by the related broadcast system to the local storage area network or the network-attached storage for use in the distribution system 14.

Referring back to step 226, if the content is not valid with no errors (errors are detected), step 250 reprocesses the content a pre-determined number of times. The number of times for reprocessing is determined by the workflow system 54. The workflow system 54 may obtain the number of reprocessing tries from an operator. After step 250, step 252 sends a failure message to an operator if content has not been processed properly within the predetermined number of times. In step 254, human intervention may be required if the content is not processed properly.

As is evident by the description above, the system is a highly automated system and provides significant advantages in terms of the processing required for processing the content. It should be noted that the various decoders and encoders may be used simultaneously so that multiple formats of the file may be produced simultaneously.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of forming a content signal comprising:
   receiving content;
   storing the content in a first format as a first file in a first folder in a content repository;
   determining a target for the first file;
   communicating the targets and a material identifier to a work flow system;
   associating the material identifier with the first file in the first folder of the content repository;
   copying the first file to the workflow system;
   communicating the first file to a plurality of content converters in response to the targets;
   converting the content at the plurality of converters and forming a plurality of converted files in formats different than the first format;
   storing the plurality of converted files in a second folder of the content repository;
   copying the plurality of converted files to an analyzer tool to form copied files;
   analyzing the copied files in the analyzer tool;
   when no errors are detected in the analyzer tool, communicating an availability signal to the work flow system;
   copying the converted files to a third folder of the content repository in response to the availability signal.

2. A method as recited in claim 1 wherein receiving content comprises receiving at least one of a tape, DVD, compressed file from a satellite receiver or a file from a telephone line.

3. A method as recited in claim 1 wherein analyzing the copied files comprises analyzing if the copied files are valid.

4. A method as recited in claim 3 further comprising after analyzing the copied files, generating a report.

5. A method as recited in claim 4 further comprising communicating the report to the work flow system.

6. A method as recited in claim 5 further comprising when the report is positive, reprocessing the first file.

7. A method as recited in claim 1 prior to storing the content in the content repository, editing the content.

8. A system comprising:
   a receiving system receiving content;
   a content repository storing the content in a first format as a first file in a first folder;
   a work flow system determining targets and a material identifier for the first file and copying the first file to a plurality of content converters corresponding to the targets; and
   a plurality of content converters converting the content and forming a plurality of converted files in formats different than the first format;
   said content repository storing the converted files in a second folder therein;
   an analyzer tool copying the converted files from the content repository to form copied files and communicating an availability signal to the work flow system when no errors are detected;

said work flow system copying the converted files to a third folder of the content repository in response to the availability signal.

9. A system as recited in claim 8 further comprising a distribution system coupled to the content repository for distributing at least one of the converted files to a user.

10. A system as recited in claim 9 wherein the distribution system comprises a transmission system.

11. A system as recited in claim 10 wherein the transmission system comprises broadband cable.

12. A system as recited in claim 10 wherein the transmission system comprises a satellite system.

13. A system as recited in claim 10 wherein the transmission system comprises broadband cable and a satellite system.

14. A system as recited in claim 8 wherein the content converter comprises a decoder and an encoder.

15. A system as recited in claim 8 wherein the content converter comprises a bitstream converter.

16. A system as recited in claim 8 wherein the receiving system comprises at least one of a satellite receiving system, a tape based receiving system, a video disk receiving system and a terrestrial communication receiving system.

* * * * *